Figure 1:
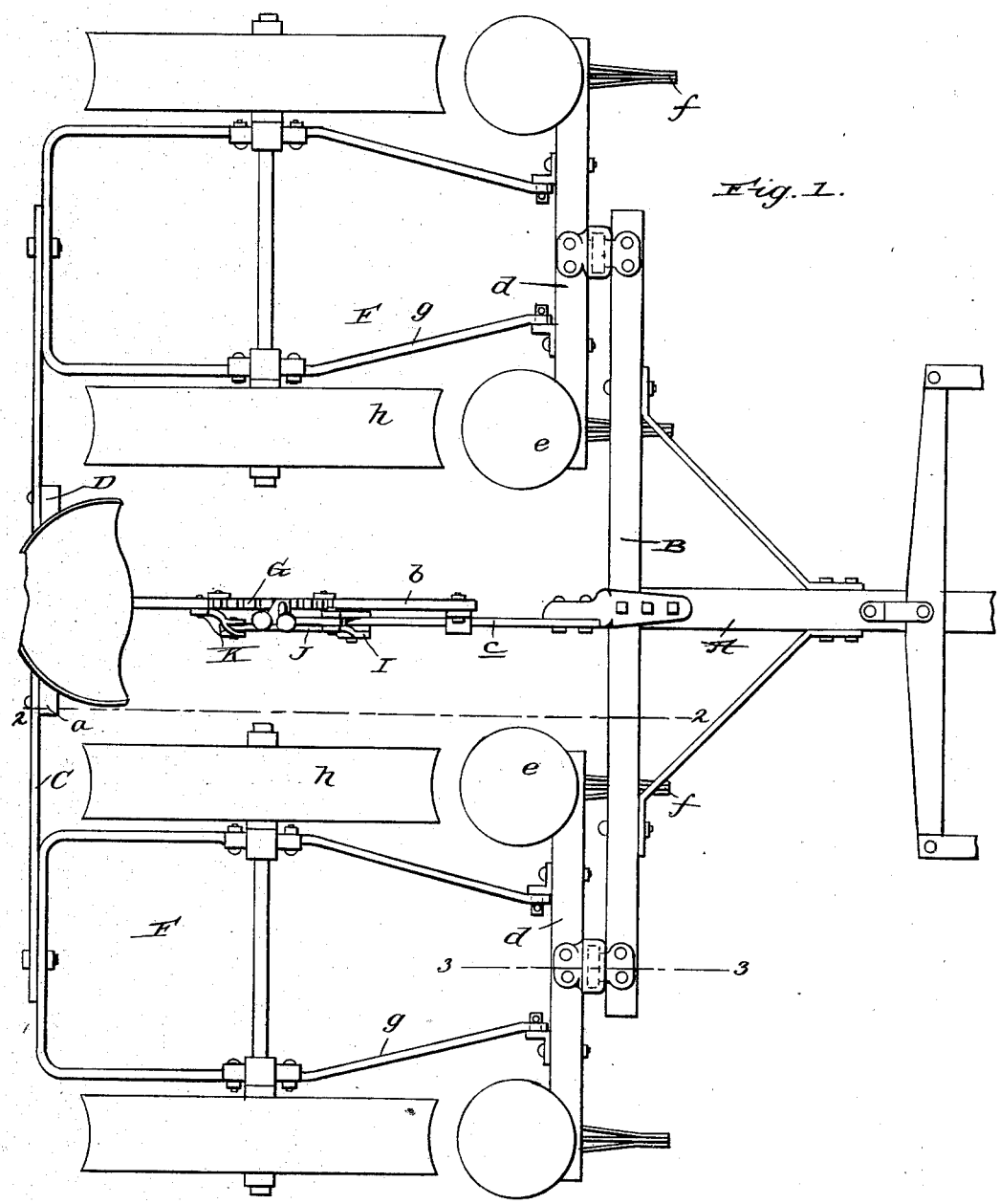

No. 731,658. PATENTED JUNE 23, 1903.
R. V. BARRY.
CORN PLANTER.
APPLICATION FILED SEPT. 18, 1902.
NO MODEL. 2 SHEETS—SHEET 2.
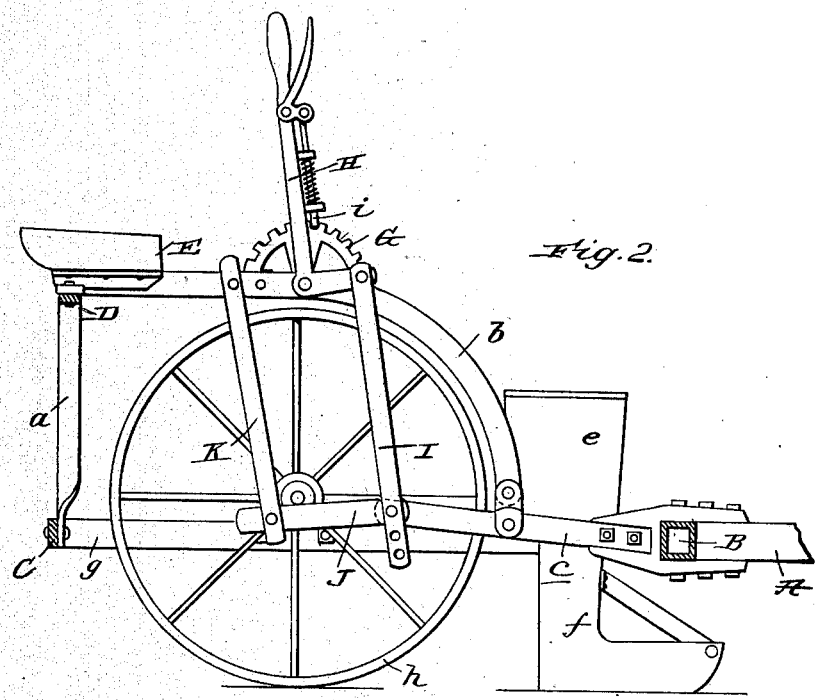
Fig. 2.
Fig. 3.
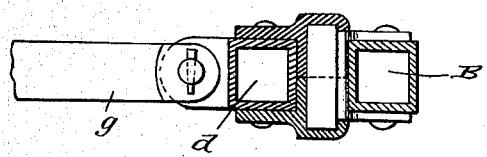
Witnesses
Inventor
R. V. Barry
By Jas. J. Sheehy Attorney No. 731,658.

Patented June 23, 1903.

UNITED STATES PATENT OFFICE.

RICHARD V. BARRY, OF IOWA CITY, IOWA, ASSIGNOR TO BARRY FOUR-ROW CORN PLANTER COMPANY, OF IOWA CITY, IOWA.

CORN-PLANTER.

SPECIFICATION forming part of Letters Patent No. 731,658, dated June 23, 1903.

Application filed September 18, 1902. Serial No. 123,933. (No model.)

*To all whom it may concern:*

Be it known that I, RICHARD V. BARRY, a citizen of the United States, residing at Iowa City, in the county of Johnson and State of Iowa, have invented new and useful Improvements in Corn-Planters, of which the following is a specification.

My invention relates to corn-planters, and is designed more particularly as an improvement upon the four-row corn-planter forming the subject-matter of my Letters Patent No. 597,193, bearing date of January 11, 1898.

The general object of the present invention is to provide a four-row corn-planter embodying such a construction that it is able to adjust itself to the ground, no matter how hilly or uneven, and hence is adapted to plant the corn at a uniform depth in the several rows. The ability of the planter to adapt itself to uneven and hilly ground is also advantageous, since it renders the planter very light of draft and enables it to run steady and make straight rows.

Other advantageous features of the invention will be fully understood from the following description and claims, when taken in conjunction with the accompanying drawings, in which—

Figure 1 is a plan view of my improved four-row corn-planter; Fig. 2, a vertical longitudinal section taken in the plane indicated by the broken line 2 2 of Fig. 1; and Fig. 3 an enlarged detail section taken in the plane indicated by the broken line 3 3 of Fig. 1.

Similar letters of reference designate corresponding parts in all of the views of the drawings, referring to which—

A is the tongue or pole of the improved planter, which is preferably of wood; B, a cross-bar, preferably hollow, fixedly connected to the rear end of the tongue or pole and extending at either side of the same; C, a cross-bar disposed in rear of the bar B; D, a seat-support made up of a U-shaped upright $a$, connected to and rising from the cross-bar C, and a longitudinal central bar $b$, fixedly connected at one end to the upright $a$ and pivotally connected at its opposite end to a bar $c$, fixed to and extending in rear of the tongue A, and E a seat arranged on the support D. The cross-bars B and C and the seat-support D are preferably of metal, and in conjunction with the tongue A they form the main frame of the planter.

F F are frames interposed between the cross-bars B and C of the main frame. In the present and preferred embodiment of my invention these frames F respectively comprise a cross-bar $d$, disposed in rear of and parallel to the bar B and equipped with seedboxes $e$, runners $f$, and seed-dropping devices, (not shown,) and a U-shaped portion $g$, disposed in rear of the cross-bar $d$ and equipped with combined supporting and seed-covering wheels $h$, the latter, of course, being arranged in alinement with the furrow openers or runners $f$. The cross-bars $d$ and portions $g$ of the frames F are pivotally connected to the cross-bar B and the cross-bar C, respectively, in such manner as to enable the said frames to oscillate or rock as a whole in the direction of the width of the planter—*i. e.*, laterally—while the portions $g$ of the frames are pivotally connected to the cross-bars $d$ thereof in such manner as to enable said portions $g$ to swing up and down on the bars $d$ in the direction of the length of the machine, or longitudinally.

By virtue of the ability of the frames F to oscillate or rock laterally, or in the direction of the width of the machine, it will be observed that the machine is enabled to adjust itself to inequalities of the ground and consequently plant the corn at a uniform depth in the several rows; also, that as the runners go into the ground without any force the machine is adapted to run steady, so as to enable the driver to make straight rows, and is light of draft, being, in fact, but little harder on the draft-animals than an ordinary two-row planter. It will further be observed that the flexible connection between the portions $g$ and bars $d$ of the frames F enable the said portions $g$ to swing upwardly in the direction of the length of the machine when the wheels $h$ are raised by clods or other obstructions higher than the runners. This obviously contributes materially to the lightness of draft of the planter and assures the runners remaining at a uniform depth in the ground.

G is a segmental rack fixed on the bar $b$ of the seat-support D; H, a bell-crank hand-lever fulcrumed on the bar *b* within convenient reach of the driver and carrying a spring-pressed detent *i*, arranged to engage the rack G; I, a link interposed between and connecting the lower arm of lever H and the rear end of the bar *c*; J, a bar pivotally connected to and extending rearwardly from the link I and bar *c*, and K a link interposed between and connecting the bar or lever J and the seat-support bar *b*.

With the parts in the positions shown in Fig. 2 it will be observed that when the lever H is released from the rack G and moved forwardly the forward portions of the frames F will be depressed, while when the lever H is moved in the opposite direction the forward portions of the frames F will be raised. In this way the depth of the furrows which the runners *f* are adapted to make may be readily regulated.

Notwithstanding its advantages as pointed out in the foregoing, it will be observed that my improved planter is very simple and inexpensive in construction and embodies no parts that are liable to get out of order after a short period of use.

I have deemed it unnecessary to illustrate seed-dropping devices on the bars *d* of the frames F, as the seed-dropping devices *per se* form no part of my present invention and may be of any suitable construction.

While I prefer to employ the means shown and described for depressing and raising the forward portions of the frames F and adjustably fixing the same, I do not desire to be understood as confining myself to such means, as any other suitable means may be employed without involving a departure from the scope of my invention. I also do not desire to be understood as confining myself to the specific construction and relative arrangement of the other parts embraced in the present embodiment of my invention, as various changes or modifications may be made in practice without departing from the scope of my claims.

Having described my invention, what I claim, and desire to secure by Letters Patent, is—

1. The combination in a corn-planter, of a main frame, and a plurality of separate frames equipped with seedboxes, runners, and combined supporting and covering wheels; said separate frames being pivotally connected to the main frame, and adapted to rock in the direction of the width of the planter, independent of each other and the main frame.

2. The combination in a corn-planter, of a main frame, and a plurality of separate frames respectively comprising a forward portion and a rear, wheel-supported portion pivotally connected to the forward portion and adapted to swing vertically thereon; the forward portions of the separate frames being pivotally connected to the main frame, and said separate frames being adapted to rock in the direction of the width of the planter, independent of each other and the main frame.

3. The combination in a corn-planter, of a main frame, and a plurality of separate frames respectively comprising a forward portion equipped with seedboxes and runners, and a rear portion equipped with combined supporting and covering wheels, and pivotally connected to the forward portion and adapted to swing vertically thereon; the forward portions of the separate frames being pivotally connected to the main frame, and said separate frames being adapted to rock in the direction of the width of the planter, independent of each other and the main frame.

4. The combination in a corn-planter, of a main frame comprising front and rear cross-bars, a plurality of separate frames, pivotal connections between the separate frames and the cross-bars, which adapt the former to oscillate in the direction of the width of the planter; the said separate frames respectively comprising a cross-bar *d* arranged parallel to the front cross-bar of the main frame, and equipped with seedboxes and runners, and a rear portion equipped with combined supporting and covering wheels, and flexibly connected to the cross-bar *d*.

5. The combination in a corn-planter, of a main frame comprising front and rear cross-bars suitably connected together, a plurality of separate frames arranged between the cross-bars of the main frame, pivotal connections between the separate frames and said cross-bars which adapt the former to oscillate laterally; the said separate frames respectively comprising a cross-bar *d* arranged in rear of and adjacent to the forward cross-bar of the main frame, and equipped with seedboxes and runners, and a rear U-shaped portion flexibly connected to the bar *d*.

6. The combination in a corn-planter, of a main frame comprising front and rear cross-bars, a tongue fixed to the front cross-bar, a bar *c* fixed to and extending in rear of the front cross-bar, and a seat-support connecting the rear cross-bar and the bar *c*, a hand-lever fulcrumed on the seat-support and connected to the bar *c*, means for adjustably fixing the hand-lever, a plurality of separate frames arranged between the cross-bars of the main frame, pivotal connections between the separate frames and the cross-bars, which adapt the former to oscillate laterally; the said separate frames respectively comprising a cross-bar *d* arranged in rear of and adjacent to the forward cross-bar of the main frame, and equipped with seedboxes and runners, and a rear U-shaped portion flexibly connected to the bar *d*.

7. The combination in a corn-planter, of a main frame, a plurality of separate frames respectively comprising a forward portion equipped with seedboxes and runners, and a rear portion equipped with combined supporting and covering wheels in line with the seedboxes and runners, and flexibly connected to the forward portion, and connections between the forward portions of the separate frames and the main frame, which
5 adapt the said separate frames to oscillate laterally independent of each other and the main frame.

In testimony whereof I have hereunto set my hand in presence of two subscribing witnesses.

RICHARD V. BARRY.

Witnesses.
W. F. MURPHY,
W. H. BAILEY.